(12) United States Patent
Deng et al.

(10) Patent No.: US 6,292,094 B1
(45) Date of Patent: Sep. 18, 2001

(54) VEHICLE-TRAILER BACKING-UP CONTROL SYSTEM WITH VEHICLE REAR WHEEL STEERING

(75) Inventors: Weiwen Deng, Sterling Heights; Yuen-Kwok Chin; William Chin-Woei Lin, both of Troy; David S. Rule, Orchard Lake; Yong Han Lee, Troy, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/758,986

(22) Filed: Jan. 16, 2001

(51) Int. Cl.$^7$ .................................................... G08B 21/00
(52) U.S. Cl. .......................... 340/431; 340/671; 701/70; 701/41; 701/42; 701/43; 701/44
(58) Field of Search ..................... 340/431, 671; 701/70, 93, 94, 75, 98, 41, 44, 42, 43

(56) References Cited

U.S. PATENT DOCUMENTS

| | | | |
|---|---|---|---|
| 5,001,639 | * 3/1991 | Breen | 364/426.01 |
| 5,097,250 | 3/1992 | Hernandez | 340/438 |
| 5,247,442 | * 9/1993 | Kendall | 364/424.05 |
| 5,396,857 | * 3/1995 | Emery, Jr. | 114/270 |
| 5,455,557 | 10/1995 | Noll et al. | 340/431 |
| 5,579,228 | * 11/1996 | Kimbrough et al. | 364/424.05 |
| 5,719,552 | * 2/1998 | Thompson | 340/431 |
| 6,016,885 | * 1/2000 | Hickman et al. | 180/418 |
| 6,129,170 | * 10/2000 | Hickman et al. | 180/418 |

* cited by examiner

Primary Examiner—Jeffery Hofsass
Assistant Examiner—Daniel Prévil
(74) Attorney, Agent, or Firm—Jeffrey A. Sedlar; George A. Grove

(57) ABSTRACT

A method is disclosed for controlling a backing maneuver of an automotive vehicle and trailer combination in which the vehicle has operator-actuated front wheel steering and microprocessor-actuated, reversible electric motor driven rear wheel steering. For a given initial alignment of vehicle and trailer, the computer-executed method first determines whether the driver needs to pull forward before commencing the backing operation. The driver is then requested to turn the front wheels in a direction suitable for backing the vehicle without a trailer in the desired direction. The process then determines whether the driver needs to perform counter front wheel steering before backing. Then the process controls the steering of the rear wheels during the backing operation.

9 Claims, 7 Drawing Sheets

Figure 4: Data of

VEHICLE-TRAILER BACKING-UP CONTROL SYSTEM WITH VEHICLE REAR WHEEL STEERING

TECHNICAL FIELD

This invention relates to steering control systems for automotive vehicles with front and rear wheel steering. More specifically, this invention relates to computer control systems for assisting the operator in backing-up a vehicle-trailer combination when the vehicle has driver-operated front wheel steering and on-board computer-controlled rear wheel steering.

BACKGROUND OF THE INVENTION

Automotive vehicles with coordinated front and rear wheel steering systems are known. In modern applications, such steering systems may be used, e.g., in relatively large sport utility vehicles or trucks. The operator retains control over the steering of the vehicle's front wheels, and a vehicle computer-based system controls steering of the rear wheels. For example, one rear wheel steering system includes an electric motor-driven, rack and pinion rear-wheel-steer actuator that, upon computer command, produces a desired rear-wheel-steer angle to enhance the handling and maneuverability of the vehicle.

When the steerable rear wheels are set at an angle to the same side of the longitudinal axis of the vehicles as the front wheels, the system is considered to be providing "in-phase" rear wheel steering. "Out-of-phase" steering, conversely, is where the rear wheels are disposed to the opposite side of the vehicle longitudinal axis from the front wheels. Out-of-phase rear wheel steering markedly shortens the turning radius of a large vehicle. The on-board steering controller determines the rear-wheel-steer angle as a function of vehicle speed and the operator hand steering-wheel angle. The system, in general, will provide an out-of-phase steering angle at low vehicle speed to reduce the turning radius of a vehicle and in-phase steering at high vehicle speed to enhance directional stability.

The steering controller, thus, continually monitors vehicle speed, forward or reverse, and the angles, right or left, of the steered wheels with respect to the longitudinal axis of the vehicle. The controller also determines the yaw rate (i.e., the turning motion) of the vehicle in setting the steering angle of the rear wheels. While the front wheels may be steered at angles, e.g., from +33° (left) to −33° (right) with respect to the vehicle axis, the steering range of the rear wheels is usually smaller, e.g., from +12° to −12°. In steering the front wheels, the operator typically can rotate the hand wheel up to about 540° in either direction from its wheel centered position.

Larger automotive vehicles are often used to pull trailers, and sometimes it is necessary for the operator to back up the vehicle-trailer combination. Backing-up a front wheel steering vehicle is now within the experience and skill of vehicle operators who need to perform such jobs. But performing the same task with a vehicle-trailer combination is counter-intuitive and not within common experience. It is an object of this invention to provide a computer-based, driver-interactive process to assist in backing-up a vehicle-trailer combination with the aid of rear wheel steering.

SUMMARY OF THE INVENTION

The invention is a driver interactive, driver advisor process that is performed largely on an on-the-vehicle microprocessor which generally would also be employed for control of the rear wheel steering.

The invention is applicable to a vehicle having rear wheels that can be steered through a reversible electric motor, and rack and pinion gearing, commanded by a suitably programmed microprocessor (a controller). The controller utilizes a sensor of a known type to measure the rear wheel angle, $\delta_r$, with respect to the vehicle axis. The vehicle has a hand steering wheel by which the operator controls the steering of the front wheels. The controller needs to know the angular position of the front wheels. This is suitably accomplished using a steering wheel position sensor and estimating the front wheel angle, $\delta_f$, based on the input of the steering wheel sensor divided by the ratio of the steering gear. The vehicle also includes a trailer hitch for receiving the tongue of a trailer. The hitch includes a sensor for providing the angle of the trailer tongue or hitch to the longitudinal axis of the vehicle, $\theta^0$, to the controller. The direction of the trailer is determined by the direction of its fixed tongue.

As stated, the vehicle includes a microprocessor-based controller for using the appropriate sensor signals for controlling the electric motor-driven rear wheel steering and, additionally, performing the computations and algorithm steps for the control of vehicle-trailer backup. The controller needs to know vehicle travelling speed (forward or reverse), $v_x$, which may be obtained from a special sensor or, as is often the case, from a brake system control module or by direct measurement of prop-shaft pulses.

As will be described, the controller will also actuate the issuance of commands to the vehicle operator during the execution of the process of this invention. The unit broadcasting or issuing such commands will sometimes be referred to in this specification as "Driver Advisor."

In the practice of the invention, the driver of a vehicle-trailer combination activates the controller when the driver wishes to receive aid in trailer backing or parking. Upon completion of the backing process, this aspect of the controller functions is shut off until needed on another trailer backing situation.

When the process is initiated by the driver, the vehicle-trailer combination has current front and rear wheel angles and a hitch angle reported to the controller by the respective sensors. The vehicle is then stopped or backing slowly. The controller system then performs calculations to determine whether the current hitch angle, $\theta^0$, exceeds the maximum permissible hitch angle, $\theta^0_{max}$, that can be overcome, while continuing to backup, utilizing the full capability of the front and rear steering. The maximum hitch angle, $\theta^0_{max}$, is a function of the maximum wheel angles, the wheel base and track of the vehicle, the distance from the vehicle rear axle to the hitch, and the trailer tongue length. This inquiry by the controller is referred to in the following specific embodiment section of this specification as Criterion 1. If the current hitch angle is larger than the maximum permissible hitch angle, the answer to the inquiry is "yes" and Criterion 1 is met. The process then requires a "pull forward" mode. The controller actuates the Driver Advisor to prompt the driver to pull the vehicle forward to reduce the hitch angle. The controller continues to receive sensor signals and assess the changing current hitch angle until this criterion is not met, and the "pull forward" mode is cleared.

If Criterion 1 is not met or after a pull forward mode is cleared, the controller issues a command to the Driver Advisor to prompt the driver to first center the steering wheel and then steer such that the front wheel angle, $\delta^*_f$, is in the direction and amount where the driver would steer during backing toward the target position if without towing a trailer. Based on the driver's steering decision of the front wheel angle, $\delta^*_f$, the controller system determines a desired hitch angle, $\theta^*$, that must be achieved in order to comply with the driver-determined front wheel angle.

The controller system now calculates the maximum allowed front steering wheel angle, $\delta_{f\,max}$, for achieving the desired hitch angle without counter steering of the front wheels. The controller calculates to determine this maximum value allowed for the driver's command of the front wheel angle such that with a potential available assist of a given maximum rear wheel steering angle, the trailer can be backed to where the driver wants to put it. The controller then determines whether the driver's front wheel angle command, $\delta^*_f$, (in road wheel angle) is beyond this maximum allowed front wheel angle, $\delta_{f\,max}$. This is referred to here as Criterion 2. If the driver's command exceeds the maximum allowed angle, the answer is "yes" and Criterion 2 is met. If so, a "counter steer" mode is entered, and the Driver Advisor prompts the driver to counter steer, or turn the front wheels in the opposite direction, at the system-calculated amount, until Criterion 2 is not met and the "counter steering" mode is cleared. The vehicle-trailer combination is being slowly backed during this controller processing. If Criterion 2 is not met or after suitable counter-steered backing, the controller and process continue to the next stage of the vehicle-trailer backing process.

The vehicle-trailer combination is still being backed slowly at the driver-set steering wheel position, $\delta^*_f$. The respective positions of the vehicle, trailer and steering wheel are such that the backing process can be successfully completed with the assistance of the programmed controller.

The system correlates or maps the driver's command, $\delta^*_f$, to the desired hitch angle, $\theta^*$, and continually calculates the difference, $\Delta\theta$, between the desired and currently measured hitch angle to determine a desired incremental (positive or negative) rear wheel angle necessary to obtain the desired hitch angle. In a preferred embodiment, the rear wheel angle change calculation is based on a proportional-integral-derivative control algorithm that will be described in a following section of this specification. The incremental change in rear wheel angle is used to modify the rear wheel command in driving the rear wheel steering system and successfully completing the vehicle-trailer backing operation.

In this automatic rear wheel control backing process, the system determines if driver's steering, the controlled rear wheel steering and the movement of the trailer are consistent with trailer movement and his/her steering as if backing a vehicle without towing a trailer. This determination is referred to here as Criterion 3. For example, Criterion 3 is met when the movement of the trailer, due to the combination of front and rear wheel steering, is different than the intuition of the driver. In the case of a "yes" response to Criterion 3, the system is set to an "assistance" or driver assurance mode, and the Driver Advisor will assure the driver that the vehicle/trailer is moving in the right direction. If Criterion 3 is not met, then Criterion 4 is met.

When Criterion 4 is met, an "automatic" mode is set in the controller system, and the system enters automatic adjustment of the rear wheel angle without need of Driver Advisor assistance or notification. When the backing operation is complete, the backing subroutine of the controller is turned off.

As indicated in the above summary, calculations are used to relate and determine several parameters such as present, desired or maximum front wheel, rear wheel and hitch angles. As will be described in more detail below, these involve complex trigonometric angular relationships and functions also including the wheelbase and track of the vehicle, the length of the fixed trailer tongue and the distance of the hitch from the rear axle of the vehicle. Equations have been developed to model the steps of this invention. As will be seen, since some of these parameters are fixed for a given vehicle and can be generalized for size classes of trailers, many of the process calculations can be done in advance for a vehicle design and the results stored as graphs or look-up tables in the computer memory of the controller.

Thus, the subject process provides driver-initiated assistance in the backing of rear wheel-steerable vehicles that are hitched to a trailer. The process is efficient in terms of computer requirements and can initiate the broadcasting of instructions or advice to a vehicle operator during the stress of the backing operation. Other objects and advantages of this invention will become apparent from a detailed description of preferred embodiments of the invention which follow.

BRIEF DESCRIPTION OF THE DRAWINGS

In the drawings, the same elements or components are given the same numbers in the various figures in which they appear.

DESCRIPTION OF THE PREFERRED EMBODIMENT

Figure 1:
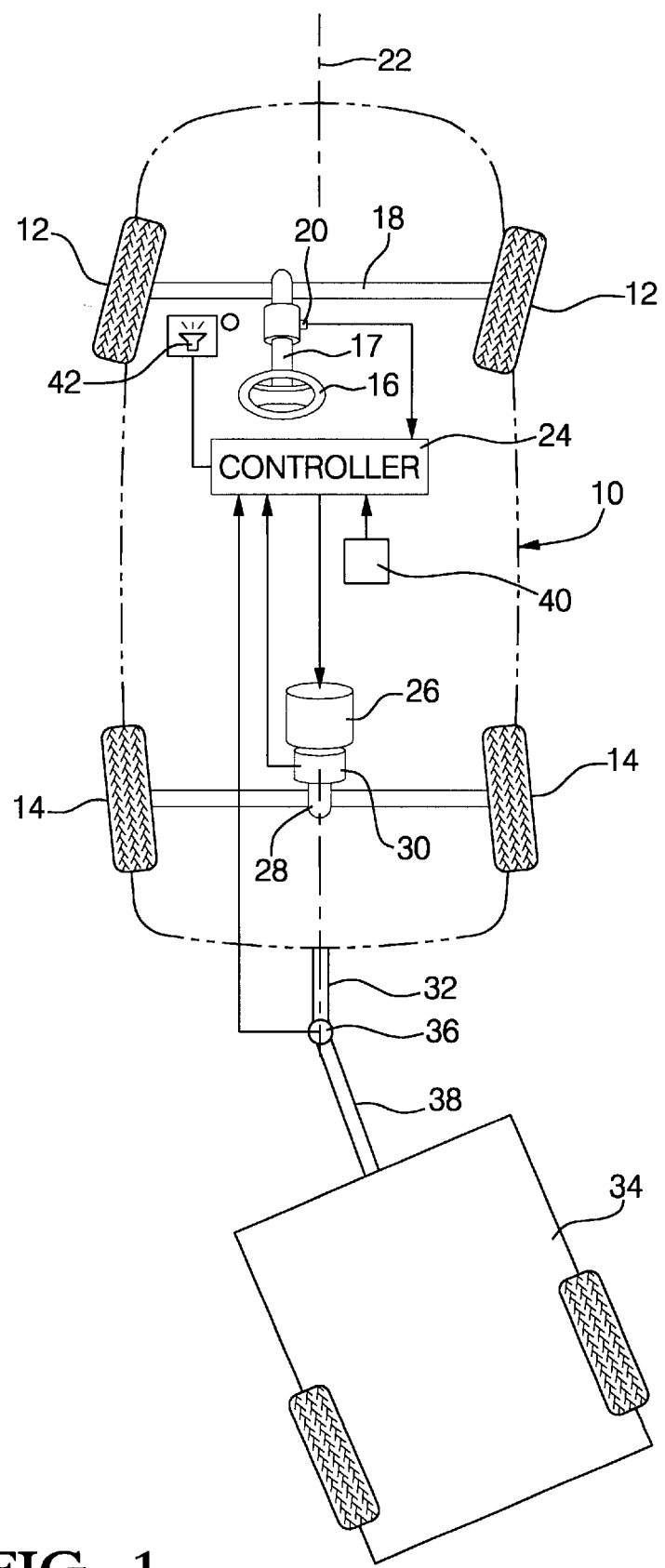
FIG. 1 is a schematic plan view of a front and rear wheel steering automotive vehicle and trailer for illustrating the vehicular components used in the practice of the invention.
Figure 2:
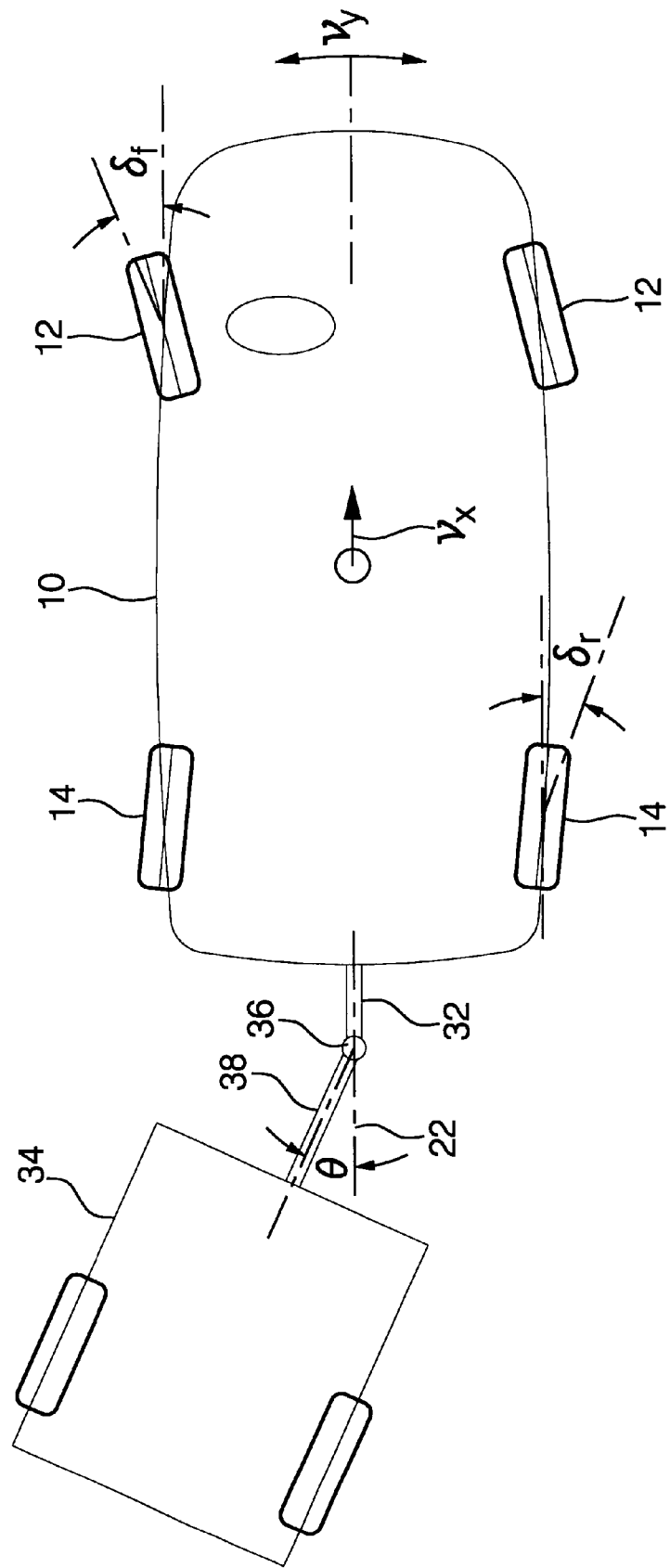
FIG. 2 is a simplified schematic plan view of a vehicle and trailer illustrating wheel and hitch angles used in the practice of this invention.

The operation of a vehicle equipped for operator-controlled front wheel steering and computer-controlled rear wheel steering permits more flexible maneuvering of the vehicle, especially a large sport utility vehicle or truck, when moving in a forward direction. The driver soon adapts to the controller-assisted rear wheel steering and takes advantage of the improved maneuverability of the vehicle. However, when backing the vehicle with a hitched trailer, maneuvering becomes more complicated and counter-intuitive. FIGS. 1 and 2 illustrate a front and rear wheel steerable vehicle and an attached trailer. FIGS. 7–10 also show the same components in different backing-up positions to illustrate process parameters that are used in the practice of this invention.

Vehicle 10 (shown in outline in FIG. 1) has steerable front wheels 12 and rear wheels 14. The directional heading of front wheels 12 is controlled through a driver-operated steering wheel 16 which is connected through a steering column 17 and associated steering linkage 18. Operator effort in steering front wheels 12 may be assisted by hydraulic or electrical mechanisms, not shown in these figures. The wheels 12 are turned together from positions straight ahead with a steering angle of zero with respect to the longitudinal axis 22 of the vehicle 10 to either the right or left of the axis 22. The maximum angular movement for a particular vehicle group is generally fixed and may be, for example, about +33° (left) or −33° (right).

In the practice of this invention, it is necessary to know the present front wheel angle, $\delta_f$, and the maximum fixed front wheel angle, $\overline{\delta}_{f\,max}$, (fixed by steering system design). The present or current wheel angle is suitably determined using a steering wheel position sensor 20 and estimating the front wheel angle, $\delta_f$, based on the input of the steering wheel sensor divided by the known ratio (e.g., 16:1) of the driver steering wheel rotation to front wheel angular turning movement. The signal from sensor 20 is continually transmitted to steering controller 24.

The rear wheels 14 of vehicle 10 are turned in unison using a two-way or reversible electric motor 26 and a rack and pinion steering mechanism 28. The turning of rear wheels 14 is actuated in a determined direction by a suitably programmed controller 24 in combination with a sensor 30 that measures the rear wheel angle, $\delta_r$, with respect to the vehicle axis 22. The rear wheels by vehicle design also have a fixed maximum angle, $\overline{\delta}_{r\,max}$.

The vehicle also includes a trailer hitch 32 for receiving a fixed tongue 38, two wheel trailer 34. The hitch 32 includes a sensor 36 for providing the angle, $\theta^0$, of the rigid trailer tongue 38 or hitch to the longitudinal axis 22 of the vehicle to the controller.

As stated, controller 24 includes a microprocessor and associated computer input-output components for receiving and manipulating the appropriate sensor signals, e.g., 20 and 30 for controlling the rear wheel 14 steering and, additionally, performing the computations and algorithm steps for the control of vehicle-trailer backup. The controller 24 needs to know vehicle travelling speed, $v_x$, in a fore-aft direction which may be obtained from a special sensor 40 or, as is often the case, from a brake system control module or by direct measurement of prop-shaft pulses. The controller will also obtain or determine the current yaw rate, $v_y$, of the vehicle. In this preferred embodiment, controller 24 will also actuate the issuance of commands to the vehicle operator during the execution of the process of this invention. The unit broadcasting or issuing such commands 42 is referred to in this specification as "Driver Advisor."

During much of the vehicle operating time, it is driving in a forward direction and the controller 24 is programmed to manage rear wheel steering in accordance with suitable algorithms. The assignee of this invention has rear wheel steering mechanism and control algorithm for quadra-wheel steering, known as QS4. At relatively low vehicle speeds, the rear wheels can be steered out of phase with the front wheels to shorten the turning radius of the vehicle. When the vehicle is backing, the rear wheel angle can often be used to quickly change the hitch angle.

If the vehicle needs to be backed with a trailer in tow, the maneuvering of the vehicle 10 and trailer 34 can become quite complicated. Rear wheel steering controller 24 can be actuated by the vehicle operator to expand its steering managing scope to include the following associated or sub-process. In the description of the process, reference will be made to FIG. 3 which is a flow chart of the algorithm of the process. Reference will also be made to FIGS. 7–10 which illustrate the positions of the vehicle 10 and trailer 34 in various steps of the process.

Figure 3:
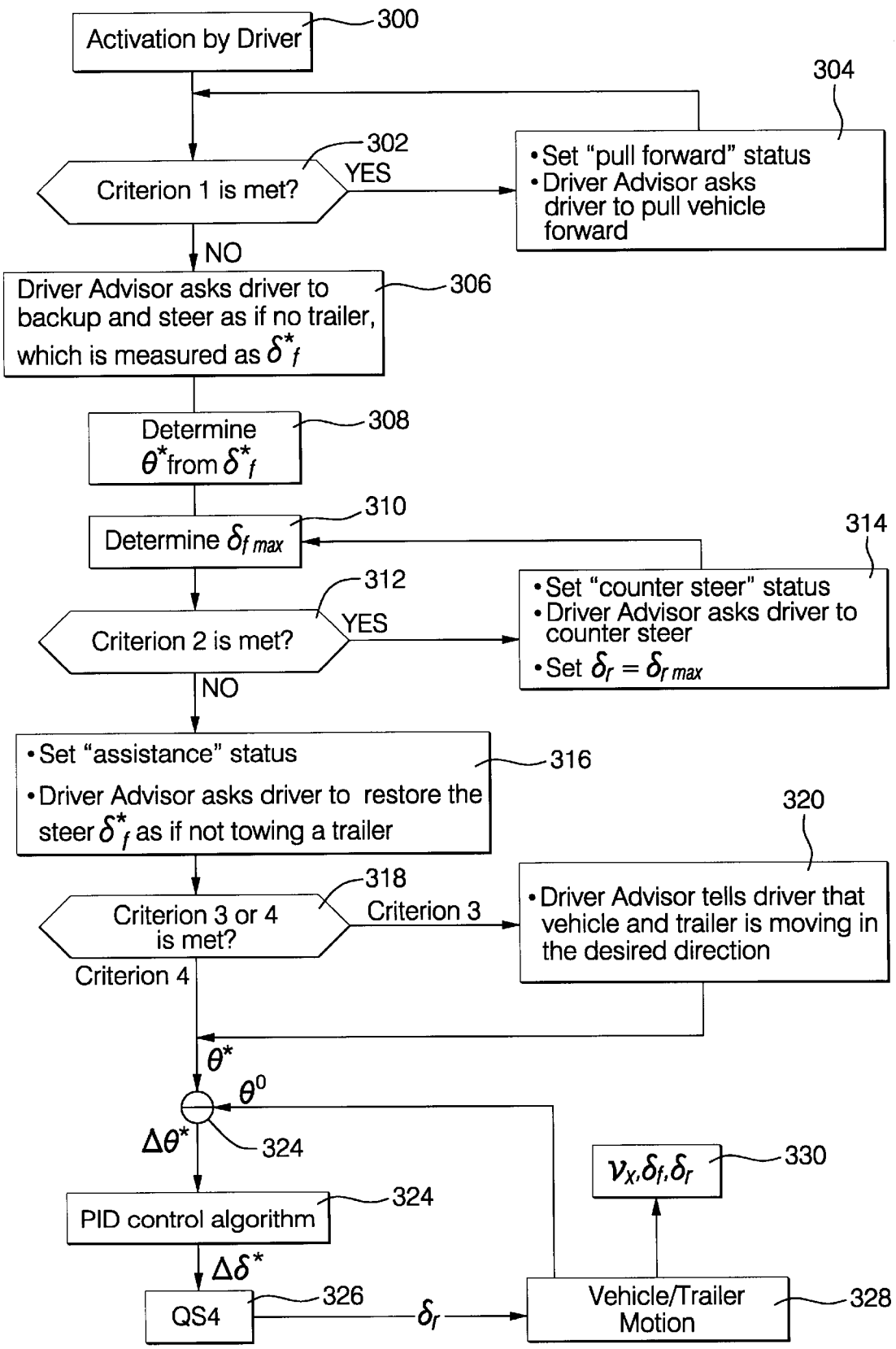
FIG. 3 is a flowchart of an embodiment for the practice of the process of this invention.

The entry to the subject trailer backing process is initiated by the driver of the vehicle, block 300 of FIG. 3. This may be done by signaling the controller by any suitable switching or other communication means that the driver wishes assistance in a vehicle-trailer backing maneuver. At the time this backing process is initiated, vehicle and trailer are in a current alignment and have a current velocity, $v_x$, which may be zero or negative.

Figure 7:
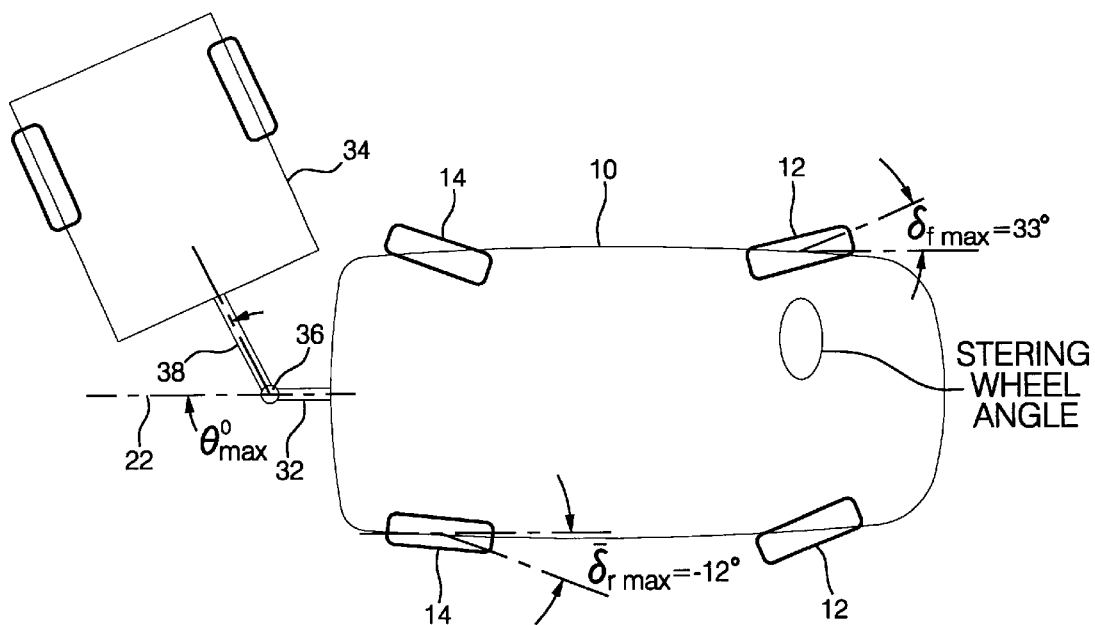
FIG. 7 is a schematic plan view of a vehicle and trailer positioned to illustrate an application of Criterion 1 in the practice of the invention.

In illustrating a preferred embodiment of the invention, certain design fixed parameters of the vehicle must be specified to perform the computer-based process. Here it is assumed that in the design of the vehicle, the maximum front wheel turning angle is 33° (left) to −33° (right) and, correspondingly, the maximum rear wheel turning angle is from 12° to −12° as illustrated in FIG. 7. The wheel base of the vehicle, $L_1$, is 2.978 meters; the track, T, is 1.7 m; the length of the trailer tongue, $L_2$, is 5 m and the distance from the rear axle of the vehicle to the hitch, h, is 1.7 m. FIG. 7 also illustrates the trailer 34 at a maximum hitch angle, $\theta^0_{max}$, with respect to the axis 22 of the vehicle and hitch 32.

In making determinations of wheel and hitch angles in accordance with the invention, a suitable approach is to use the equation below which describes the yaw rate relationship between vehicle and trailer under steady state:

vehicle yaw rate=trailer yaw rate $$v_x \left[ \frac{\tan\overline{\delta}_{f\max} - \tan\overline{\delta}_{r\max}}{L_1 + y_1(\tan\overline{\delta}_{f\max} - \tan\overline{\delta}_{\max r})} \right] = \frac{1}{L_2}(v_x \sin\theta^0_{\max} + v_{yh}\cos\theta^0_{\max}) \quad (1)$$

where $$v_{yh} = -v_x \left[ \frac{\tan\overline{\delta}_{f\max} - \tan\overline{\delta}_{r\max}}{L_1 + y_1(\tan\overline{\delta}_{f\max} - \tan\overline{\delta}_{r\max})} \right](x_0 + h),$$

is hitch velocity in y direction.

$$x_0 = -\tan\overline{\delta}_{r\max} \cdot (y_2 - y_1)$$

$$y_2 = \frac{L_1 + y_1(\tan\overline{\delta}_{f\max} - \tan\overline{\delta}_{r\max})}{(\tan\overline{\delta}_{f\max} - \tan\overline{\delta}_{r\max})}$$

If $\delta_f > \delta_r; y_1 = T/2$

If $\delta_f < \delta_r; y_1 = -T/2$ $\delta_f$, $\delta_r$ are front and rear wheel angles, and $\overline{\delta}_{f\,max}$, $\overline{\delta}_{r\,max}$ are vehicle design maximum angles of front and rear wheels as, e.g., specified above, $L_1$ is wheel base, $L_2$ is tongue length, T is wheel track width and h is the vehicle rear axle to hitch distance. The values used to calculate the table data are: $L_1$=2.978 m; $L_2$=5 m; T=h=1.7 m.

In the control process the following relationships are used.

$\theta^0$: hitch angle information based on measurement from sensor $\theta^*$: the desired hitch angle, determined based on driver's command of $\delta^*_f$ and vehicle-trailer geometry information. See FIG. 4 for the sample graphical data based on the above-stated vehicle/trailer parameters.

$\theta^0_{max}$: the maximum hitch angle at which the driver can overcome, while backing the vehicle, through fully utilizing maximum authority of the combination of front and rear wheel steering. The value is predetermined as a function of vehicle/trailer geometry (in present implementation, it is 60.0°). $\theta^0_{max}$ can be estimated by equation (2):

$$\theta^0_{max} = \sin^{-1}\left[\frac{p}{(L_1 + y_1 p)\sqrt{A^2 + B^2}}\right] - \beta \quad (2)$$

where:

$p = \tan(\overline{\delta}_{f\,max}) - \tan(\overline{\delta}_{r\,max})$ $A = \frac{1}{L_2}$ $B = \frac{1}{L_1 + y_1 p}[L_1 \tan(\overline{\delta}_{rmx}) - ph]$ $\beta = \sin^{-1}\left(\frac{B}{\sqrt{A^2 + B^2}}\right)$ $\Delta\theta$: the difference between desired hitch angle $\theta^*$ and the measurement of the current position $\theta^0$.

$\delta_f$: front wheel angle based on the measurement of steering wheel angle from sensor divided by gear ratio.

$\delta^*_f$: driver's input as a command on front wheel, based on measurement of steering wheel angle from sensor when driver gives a steering command, divided by gear ratio.

Figure 5:
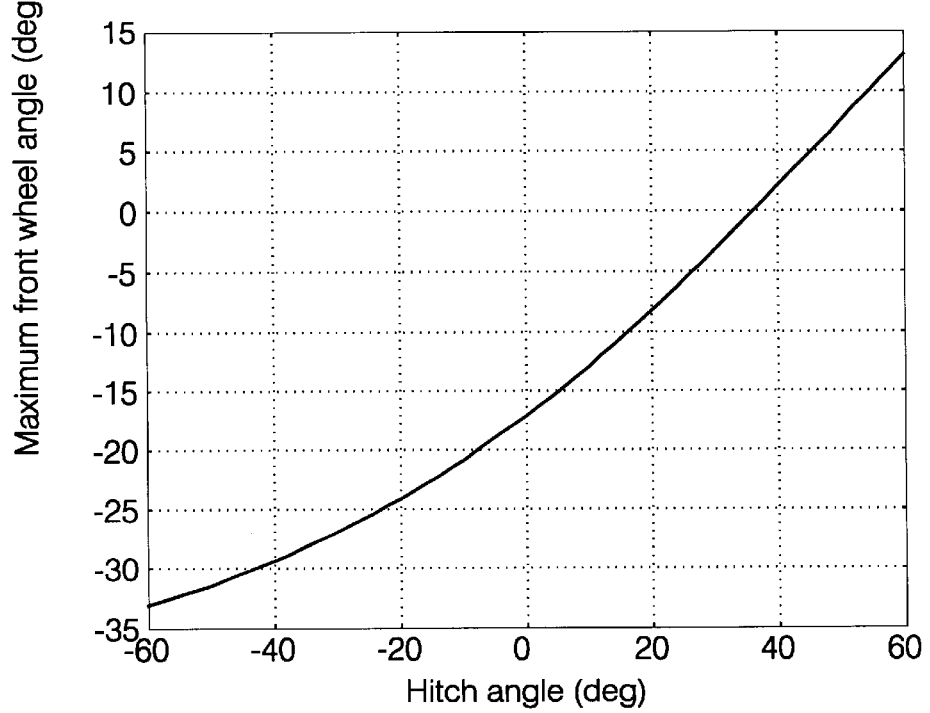
FIG. 5 is graph, complementary to FIG. 4, correlating a maximum usable front wheel angle, $\delta^1_{f\,max}$ (in degrees) with a hitch angle (in degrees) such as determined in FIG. 4 at maximum rear wheel angle of −120 (to the right).

$\delta_{f\,max}$: the maximum value allowed for driver's command of front wheel angle such that a given maximum rear wheel steering $\overline{\delta}_{r\,max}$ can fulfill the requirement. This is determined based on equation (3), which is derived from equation (1). An example data is shown in FIG. 5 for $\delta^1_{f\,max}$ at $\overline{\delta}_{r\,max}$=−12° (to the right) and FIG. 6 for $\delta^2_{f\,max}$ at $\overline{\delta}_{r\,max}$=12° (left).

$$\delta_{f\max} = \tan^{-1}\left[\tan(\overline{\delta}_{r\max}) + L_1\left(\frac{\tan(\overline{\delta}_{r\max})\cos\theta^0 + \sin\theta^0}{L_2 - y_1\sin\theta^0 + h\cos\theta^0}\right)\right] \quad (3)$$

$\Delta\delta^*_r$: the increment of rear wheel steering angle corresponding to $\Delta\theta$ to modify rear wheel angle command, $\delta^*_r = \delta^*_{r0} + \Delta\delta^*_r$, based on a PID (Proportional-Integral-Derivative) control algorithm.

$$\Delta\delta^*_r = \left(P\Delta\theta + I\int \Delta\theta dt + D\frac{d\Delta\theta}{dt}\right) \quad (4)$$

where $\delta^*_{r0}$ is the current rear wheel angle from measurement. The gains of P, I and D can be a set of experimentally-determined constants that result in fastest response with minimum overshoot of the rear wheel position.

Continuing with the description of the FIG. 3 flowchart, upon activation of the process at block 300, the process proceeds to query block 302. In the step indicated by query block 302, the controller determines whether the present hitch angle, $\theta^0$, as indicated by the hitch angle sensor, is greater than the maximum hitch angle, $\theta^0_{max}$, at which the driver can overcome, without pulling the vehicle forward, through fully utilizing maximum capability of the combination of front and rear wheel steering. The maximum hitch angle is estimated using equation (2). Thus, in block 302, the controller determines whether $|\theta^0|>|\theta^0_{max}|$; see illustration in FIG. 7. This is called Criterion 1 in block 302. In the example of $\theta^0_{max}$ illustrated in FIG. 7, the front wheels are seen turned the maximum amount to the left and the rear wheels are turned their maximum amount to the right positioned to straighten out the trailer hitch angle from its present position. If the hitch angle were larger, the trailer could not be straightened without pulling the vehicle forward.

If the answer to the block 302 query is "no," the process proceeds to block 306.

If the answer to the block 302 query is "yes," the process proceeds to block 304 where the process is in "pull forward" status and the Driver Advisor instructs the driver to pull forward. The driver straightens the front wheels and slowly pulls the vehicle forward, with the process cycling through blocks 302 and 304 until the hitch angle is suitably reduced, i.e., Criterion 1 is no longer met. Then "pull forward" status is cleared and a command is sent from the controller to the Driver Advisor to advise the driver to stop pulling forward and to shift into reverse and the process proceeds to block 306.

Figure 4:
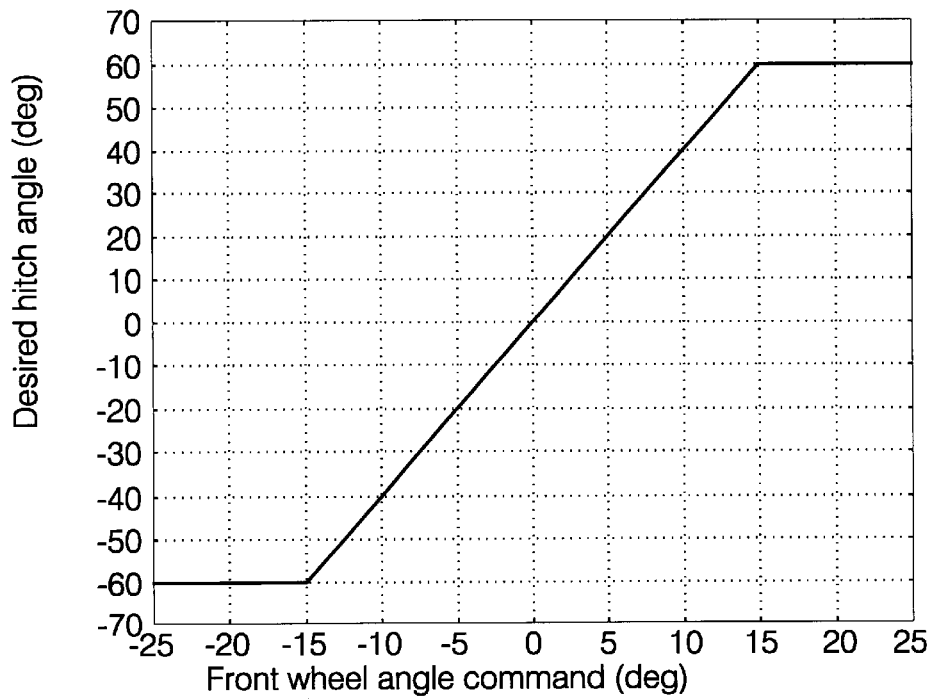
FIG. 4 is a graph, predetermined for a specific vehicle/trailer combination, correlating a desired hitch angle, $\theta^*$, (in degrees) resulting from a driver-initiated front wheel angle, $\delta^*_f$, command (in degrees).

In block 306, the controller has the Driver Advisor instruct the driver to backup and steer the front wheels to achieve a desired vehicle-trailer position as if no trailer was present. The driver turns his/her steering wheel for a front wheel angle position of best judgment, $\delta^*_f$, and commences backing slowly, and the controller determines the desired hitch angle, $\theta^*$, from the driver's input, $\delta^*_f$, block 308. The value of the desired hitch angle, $\theta^*$, may be determined experimentally, and preferably these relationships for a range of driver steering inputs and trailer sizes are made offline and stored in the memory of the controller. FIG. 4 presents the relationship between $\delta^*_f$ and $\theta^*$. For example, referring to FIG. 4, for a driver input of $\delta^*_f$=10°, $\theta^*$=40°.

The controller then determines the maximum front wheel angle, $\delta_{f\,max}$, process block 310, the maximum value allowed for driver's command of front wheel angle such that a given maximum rear wheel steering $\overline{\delta}_{r\,max}$, can fulfill the requirement. This is determined based on equation (3), also stated above, which is derived from equation (1). An example of pre-calculated and graphed data is shown in FIG. 5 for $\delta^1_{f\,max}$ at $\overline{\delta}_{r\,max}$=−12° and FIG. 6 for $\delta^2_{f\,max}$ at $\overline{\delta}_{r\,max}$=12°. The negative sign (−) denotes that the wheels are turned right and the plus sign (+) denotes that the wheels are turned left.

$$\delta_{f\max} = \tan^{-1}\left[\tan(\overline{\delta}_{r\max}) + L_1\left(\frac{\tan(\overline{\delta}_{r\max})\cos\theta^0 + \sin\theta^0}{L_2 - y_1\sin\theta^0 + h\cos\theta^0}\right)\right] \quad (3)$$

Figure 6:
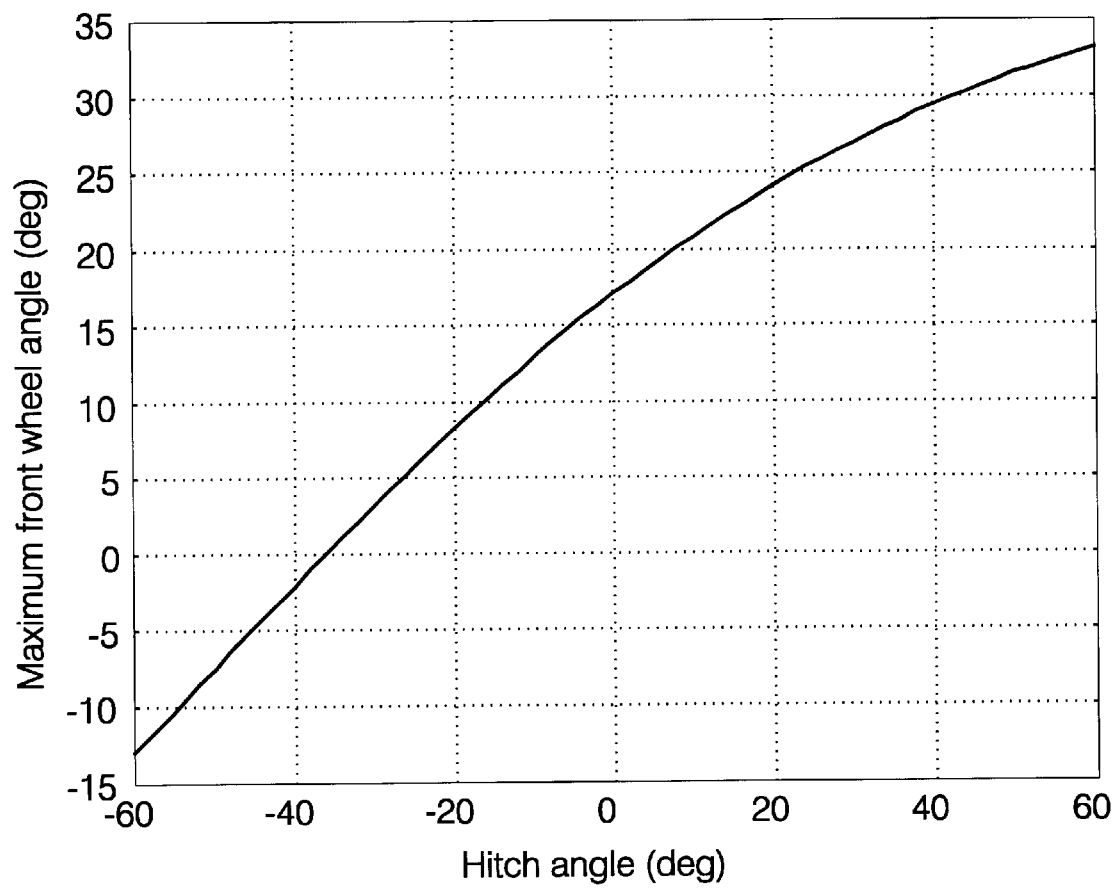
FIG. 6 is a graph, complementary to FIG. 4, correlating a maximum usable front wheel angle, $\delta^2_{f\,max}$, (degrees) with a hitch angle (in degrees) such as determined in FIG. 4 at maximum rear wheel angle of 12° (to the left).

In general, it is preferred that these values be precalculated and stored as look-up tables of data like that contained in the graphs of FIGS. 5 and 6.

Figure 8:
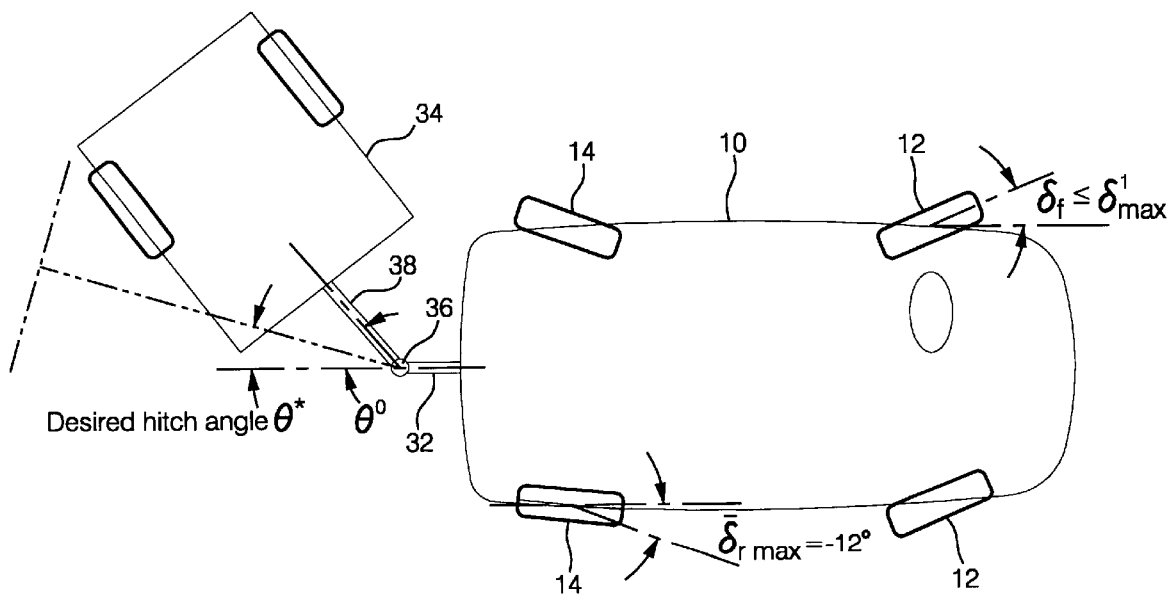
FIG. 8 is a schematic plan view of a vehicle and trailer positioned to illustrate an application of Criterion 2 in the practice of the invention.

The process proceeds to query block 312 for the following tests for Criterion 2:

a. $\theta^0 > \theta^*$ and $\delta^*_f \leq \delta^1_{f\,max}$; or b. $\theta^0 < \theta^*$ and $\delta^*_f \geq \delta^2_{f\,max}$ The comparisons of the present hitch angle and desired hitch angle and the driver's input steering command and the maximum front wheel angles are for the purpose of determining whether the desired trailer position can be reached without the driver having to turn the front wheels in the opposite direction, i.e., counter steering. This is Criterion 2. And if either of the above conditions is met, the answer is "yes" and Criterion 2 is met. FIG. 8 illustrates a situation satisfying Criterion 2 and requiring counter steering. If Criterion 2 is met, the process moves to block 314, and otherwise to block 316.

In block 314, "counter steer" status is set by the controller, and the Driver Advisor asks the driver to counter steer. As the driver turns his/her steering wheel in the opposite direction, the rear wheels are turned to their maximum angle in the direction opposite the new angle of the front wheels. The driver continues to back slowly and the process cycles between blocks 314, 310 and 312 until Criterion 2 is no longer met. The process then proceeds to block 316.

In block 316, the Driver Advisor instructs the driver to restore his/her original steer angle, $\delta^*_f$, if the process has been in "counter steer" status. Otherwise, the driver maintains such front wheel steering angle. At this stage, the attitude of the vehicle and trailer permit the controller to manage the rear wheel steering angle so that the driver can back the trailer with normal adjustment of the front wheel direction. The process enters the backing "assistance" phase and proceeds to query box 318.

Figure 9:
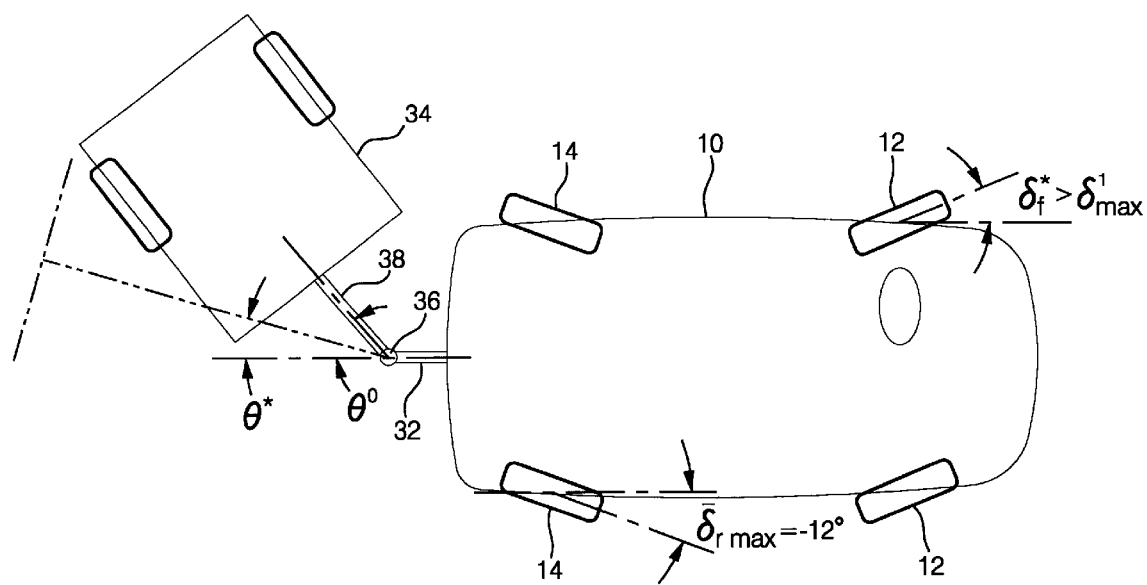
FIG. 9 is a schematic plan view of a vehicle and trailer positioned to illustrate an application of Criterion 3 in the practice of the invention.
Figure 10:
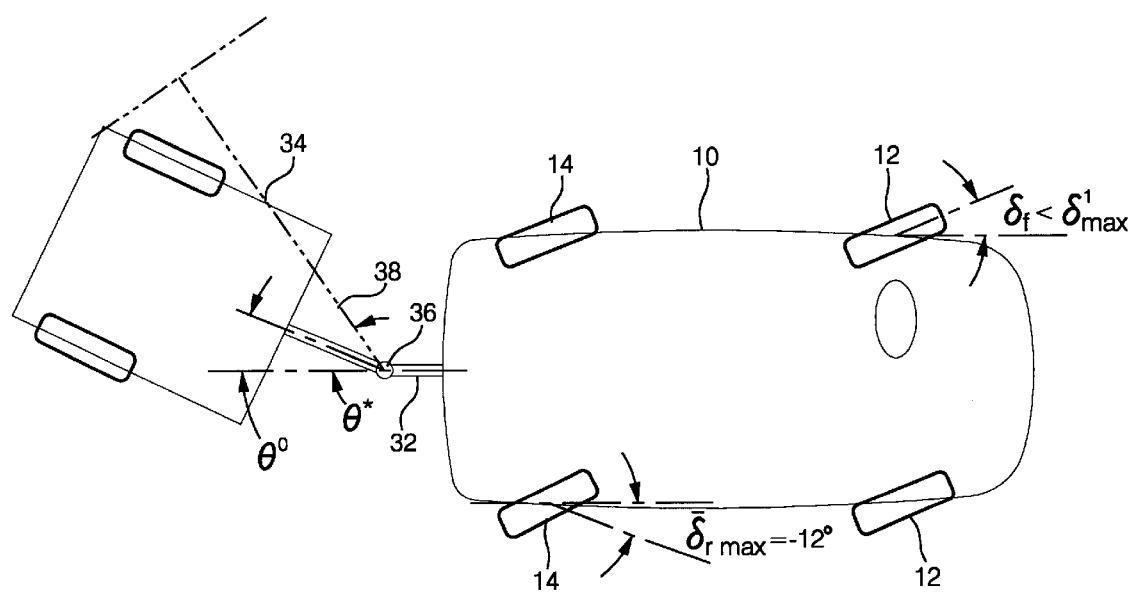
FIG. 10 is a schematic plan view of a vehicle and trailer positioned to illustrate an application of Criterion 4 in the practice of the invention.

At query box 318, the controller makes several angle comparisons to determine whether the controlled backing of the trailer may take it in a direction that causes the driver to think that he/she needs to change his/her front steering direction. In box 318, the controller determines which of Criterion 3 or 4 is applicable. FIGS. 9 and 10 illustrate examples of situations in which Criterion 3 and 4 are, respectively, applicable.

Obviously, with many possible hitch angles, positive or negative, and the possibility of in-phase or out-of-phase rear wheel angles, the trailer can experience direction changes not anticipated by the driver. FIG. 9 illustrates a Criterion 3 situation. The front wheels are turned to the left. The actual hitch angle is greater than the desired hitch angle. The rear wheels are turned to the left to reduce the hitch angle and it is seen that the trailer will move to its right. This is a situation that could confuse the driver and, accordingly, the controller causes the Driver Advisor to inform the driver that the trailer is moving in the correct direction, process block 320, before moving to calculation block 322. If the vehicle-trailer attitude does not meet Criterion 3, Criterion 4 applies. An example of the Criterion 4 situation is illustrated in FIG. 10. As seen in that figure, the actual hitch angle is less than the desired hitch angle and with the wheel alignments the trailer will move to its left as the driver expects. Under Criterion 4, no notice is given to the driver, and the process moves directly to block 322.

The controller's choice between Criterions 3 and 4 requires several comparisons as follows:

The criteria 3:

"assistance" status based on Criterion 3:

$\theta^0 > \theta^*$ and $\delta^*_f > \delta^1_{f\,max}$ or $\theta^0 < \theta^*$ and $\delta^*_f < \delta^2_{f\,max}$; and $\theta^0 \cdot \theta^* < 0$; or $\theta^0 \cdot \theta^* > 0$ and $|\theta^0| > |\theta^*|$ $\theta^0 > \theta^*$ means in this case, the hitch angle must be reduced in order to reach the desired hitch angle;

$\delta^*_f > \delta^1_{f\,max}$ means when $\delta^*_f = \delta^1_{f\,max}$ at $\delta_r = -12°$ (in order to minimize $\dot\theta$), hitch angle rate $\dot\theta = 0$; in order to reduce hitch angle, it is necessary that $\dot\theta < 0$, that is $\delta^*_f > \delta^1_{f\,max}$ or:

$\theta^0 < \theta^*$ means in this case, it is necessary to increase the hitch angle in order to reach the desired hitch angle;

$\delta^*_f > \delta^2_{f\,max}$ means when $\delta^*_f = \delta^2_{f\,max}$ at $\delta_r = 12°$ (in order to maximize $\dot\theta$), the hitch angle rate $\dot\theta = 0$; in order to increase hitch angle, it is necessary that $\dot\theta < 0$, that is $\delta^*_f < \delta^2_{f\,max}$ $\theta^0 \cdot \theta^* < 0$ means both hitch angles are in different sides (one positive and one negative), or if on the same side:

$\theta^0 \cdot \theta^* > 0$, then $|\theta^0| > |\theta^*|$ should be satisfied.

Similarly for Criterion 4, the situation not satisfying Criterion 3 will be in Criterion 4.

"automatic" status based on Criterion 4:

Criterion 3:1, and $\theta^0 \cdot \theta^* > 0$ and $|\theta^0| < |\theta^*|$

After checking both Criteria 3 and 4, block 318, the system will get into rear wheel steer control procedure. The system retrieves the current hitch angle, $\theta^0$, and the desired hitch angle, $\theta^*$, and calculates the difference, $\Delta\theta = \theta^* - \theta^0$, block 322. Block 328 represents the continual stream of data processed by the respective, above-described sensors as the vehicle-trailer is backing. Such data includes vehicle speed, $v_x$, front wheel angle, $\delta_f$, rear wheel angle, $\delta_r$, block 330, and hitch angle, $\theta^0$.

The value of $\Delta\theta$, obviously, is a measure of how much the hitch angle or trailer direction must be changed to achieve the intentions of the vehicle operator. The change in direction is to be managed by controlling the direction of the rear wheels through controller 24 and the process of this invention. As stated, the controller is continually receiving information concerning the motion of the vehicle and trailer, blocks 328 and 330, and adjusts to the driver's steering of the front wheel to correct or minimize $\Delta\theta$. The correction step is indicated in block 324.

In a preferred embodiment, the value of $\Delta\theta$ is used in an equation like (4) to calculate a rear wheel steering correction to be determined as a desired incremental (positive or negative) rear wheel angle, $\Delta\delta^*_r$.

$$\Delta\delta^*_r = \left(P\Delta\theta + I\int \Delta\theta dt + D\frac{d\Delta\theta}{dt}\right) \quad (4)$$

In accordance with this relationship, the incremental rear wheel angle is based on a proportionality factor, P, of $\Delta\theta$, an integral of $\Delta\theta$ with time, t, multiplied by a constant I and a differential of $\Delta\theta$ with time, t, multiplied by a constant D. Such factor and constants may be determined experimentally for a vehicle and trailer size class. Equation 4 is termed a PID (Proportional-Integral-Derivative) control algorithm. The resulting value of $\Delta\delta^*_r$ is then used to modify the rear wheel angle command $\delta^*_r$ in the conventional rear wheel steering system, block 326. This correction is continually made until the backing process is completed. The signals of the controller 24 are used to continually actuate the electric motor 26 controlling rear wheel angle. That is, the process cycles around blocks 322–330 with possible continuous adjustments in rear wheel angle until the operator stops the vehicle and stops the process.

In summary, upon activation of a suitable programmed controller, the subject process determines whether an arrangement of a front and rear wheel steering vehicle and trailer can (i) be backed up in its present orientation without first pulling forward to reduce the hitch angle and (ii) be backed in a direction indicated by a driver front wheel steering alignment without a counter front wheel steering maneuver by the driver. Upon making these corrections, if necessary, of the vehicle-trailer alignment, the process then manages the backing of the trailer by steering the rear wheels to reduce the difference between the continually-sensed hitch angle and the hitch angle calculated to move the trailer in the direction indicated by the operator. As an added feature, the process determines whether the backing of the trailer may take a path confusing to the operator and, in such case, assures the operator that the maneuver is proceeding properly.

While the invention has been described in terms of certain preferred embodiments, it is apparent that other like practices could readily be adapted by one skilled in the art. Accordingly, the scope of the invention is to be considered limited only by the following claims.

What is claimed is:

1. A method of assisting a vehicle operator in backing an automotive vehicle and trailer combination in an operator-determined direction, said combination having a connection between a hitch on the rear of the vehicle and a tongue of the trailer and a hitch angle between the axis of the tongue and the longitudinal axis of the vehicle; said vehicle comprising operator-controlled front wheel steering, and rear wheel steering actuated by a computer having continual access to data comprising vehicle speed, front wheel angle, rear wheel angle and said hitch angle, said wheel angles being measured from said longitudinal axis; said method being conducted by said computer upon actuation by said operator with the vehicle and trailer then aligned with a first hitch angle, said method comprising (a) determining whether said first hitch angle is of a magnitude that requires the vehicle to be pulled ahead to reduce said angle and, if so determined, instructing the operator to drive the vehicle forward to reduce said angle;

(b) requesting the operator to turn the front wheels to a front wheel angle for initiating backing of the vehicle in a direction desired by the operator for moving the trailer;

(c) using said front wheel angle to determine a target hitch angle responsive to said front wheel angle;

(d) determining whether counter steering of the front wheels is required to achieve said target hitch angle during vehicle-trailer backing and, if so determined, instructing the operator to temporarily counter steer the front wheels while continuing to back the vehicle; and thereafter (e) continually using current vehicle speed, front and rear wheel angles and hitch angle to determining the difference between the current hitch angle and the target hitch angle and continually determining a rear wheel steering angle to achieve said target hitch angle.

2. A method as recited in claim 1 further comprising continually changing said rear wheel angle in accordance with said determined rear wheel steering angle.

3. A method as recited in claim 1 further comprising determining whether said first hitch angle is of a magnitude that requires the vehicle to be pulled ahead to reduce said angle by determining whether said first angle, $\theta^0$, is greater than a maximum hitch angle, $\theta^0{}_{max}$, at which the operator can utilize the maximum wheel angles of the front and rear steering of the vehicle to reduce said hitch angle by backing the vehicle.

4. A method as recited in claim 3 further comprising estimating the value of $\theta^0{}_{max}$ by a calculation using the equation:

$$\theta^0_{max} = \sin^{-1}\left[\frac{p}{(L_1 + y_1 p)\sqrt{A^2 + B^2}}\right] - \beta$$

where:

$$p = \tan(\overline{\delta}_{f\,max}) - \tan(\overline{\delta}_{r\,max})$$

$$A = \frac{1}{L_2}$$

$$B = \frac{1}{L_1 + y_1 p}[L_1 \tan(\overline{\delta}_{rmx}) - ph]$$

$$\beta = \sin^{-1}\left(\frac{B}{\sqrt{A^2 + B^2}}\right)$$

and where $L_1$ is the wheel base of the vehicle, $L_2$ is the length of the tongue of the trailer, h is distance between the rear axle of the vehicle and the hitch, $\overline{\delta}_{f\,max}$ is the maximum front wheel angle and $\overline{\delta}_{r\,max}$ is the maximum rear wheel angle.

5. A method as recited in claim 1 in which the determination of whether said counter steering is required is based on an affirmative answer to one of the following tests:

a. $\theta^0 > \theta^*$ and $\delta^*_f \leq \delta^1_{f\,max}$; or
   b. $\theta^0 < \theta^*$ and $\delta^*_f \geq \delta^2_{f\,max}$ where $\theta^0$ is the current hitch angle, $\theta^*$ is the target hitch angle, $\delta^*_f$ is the operator-determined front wheel angle, and $\delta^1_{f\,max}$ and $\delta^2_{f\,max}$ are respectively the right turn and left turn maximum values for front wheel angle such that a given maximum rear wheel steering can avoid the necessity of counter front wheel steering, and a value of $\delta_{f\,max}$ is calculated using:

$$\delta_{f\max} = \tan^{-1}\left[\tan(\overline{\delta}_{rmax}) + L_1\left(\frac{\tan(\overline{\delta}_{rmax})\cos\theta^0 + \sin\theta^0}{L_2 - y_1 \sin\theta^0 + h\cos\theta^0}\right)\right]$$

where $L_1$ is the wheel base of the vehicle, $L_2$ is the length of the trailer tongue, $\overline{\delta}_{r\,max}$ is maximum rear wheel angle, h is the axle to hitch distance and $y_1$ is $$y_1 = \frac{T}{2} \text{ if } \delta_f > \delta_r \text{ and } y_1 = -\frac{T}{2} \text{ if } \delta_f < \delta_r \text{ where}$$

$\delta_f$, $\delta_r$ are front and rear wheel angles, and T is vehicle wheel track width.

6. A method as recited in claim 1 ether comprising, following step (d) determining whether the motion of the trailer during further backing will be opposite the direction effected solely by the front wheel angle, and if so determined, informing the operator of such motion.

7. A method as recited in claim 6 in which said determination is affirmed when:

(i) the current hitch angle, $\theta^0$, is larger than said target hitch angle, $\theta^*$, and said driver-selected front wheel angle, $\delta^*_f$, is larger than $\delta^1_{f\,max}$ as defined in this specification, or
   $\theta^0$ is less than $\theta^*$ and $\delta^*_f$ is less than $\delta^2_{f\,max}$ as defined in this specification; and (ii) $\theta^0$ times $\theta^*$ is less than zero, or $\theta^0$ times $\theta^*$ is greater than zero and the absolute value of $\theta^0$ is greater than the absolute value of $\theta^*$.

8. A method as recited in claim 1 in which step (e) further comprises continually determining said rear wheel steering angle as a mathematical function of the difference, $\Delta\theta$, between the current hitch angle, $\theta^0$, and said target hitch angle, $\theta^*$.

9. A method as recited in either claim 7 or 8 in which the difference between the current rear wheel angle and the corrected rear wheel angle, $\Delta\delta_r$, is continuously determined, in accordance with an equation of the form:

$$\Delta\delta_r = \left(P\Delta\theta + I\int \Delta\theta dt + D\frac{d\Delta\theta}{dt}\right)$$

where P, I and D are experimentally-determined constants.

* * * * *